(12) United States Patent
Igarashi et al.

(10) Patent No.: US 10,661,345 B2
(45) Date of Patent: May 26, 2020

(54) COMPOSITE PART AND CUTTING TOOL

(71) Applicant: MITSUBISHI MATERIALS CORPORATION, Tokyo (JP)

(72) Inventors: Makoto Igarashi, Naka (JP); Kazutaka Fujiwara, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 54 days.

(21) Appl. No.: 15/755,402

(22) PCT Filed: Aug. 31, 2016

(86) PCT No.: PCT/JP2016/075425
§ 371 (c)(1),
(2) Date: Aug. 24, 2018

(87) PCT Pub. No.: WO2017/038855
PCT Pub. Date: Mar. 9, 2017

(65) Prior Publication Data
US 2018/0354038 A1     Dec. 13, 2018

(30) Foreign Application Priority Data

Aug. 31, 2015  (JP) .................................. 2015-170656
Aug. 25, 2016  (JP) .................................. 2016-165182

(51) Int. Cl.
*B22F 3/00*        (2006.01)
*B22F 7/06*        (2006.01)
(Continued)

(52) U.S. Cl.
CPC ............. *B22F 7/062* (2013.01); *B23B 27/18* (2013.01); *B23K 20/026* (2013.01); *B32B 18/00* (2013.01);
(Continued)

(58) Field of Classification Search
None
See application file for complete search history.

(56) References Cited

U.S. PATENT DOCUMENTS 5,024,680 A * 6/1991 Chen .................... C09K 3/1445
                                                 51/293
5,176,720 A   1/1993 Martell et al.
(Continued)

FOREIGN PATENT DOCUMENTS

JP    04-210379 A    7/1992
JP    2007-301590 A  11/2007
(Continued)

OTHER PUBLICATIONS

International Search Report dated Oct. 18, 2016 for the corresponding PCT Application No. PCT/JP2016/075425.

*Primary Examiner* — Seth Dumbris
*Assistant Examiner* — Kim S. Horger
(74) *Attorney, Agent, or Firm* — Leason Ellis LLP

(57) ABSTRACT

A composite member in which WC-based cemented carbide members are bonded to each other via a bonding layer formed by solid phase diffusion bonding of a bonding member made of a Ti foil. The bonding layer is constituted by first layers adjacent to the WC-based cemented carbide members and made of a TiC phase and a metal W phase in which an average area ratio of the TiC phase is 40 to 60%. The bonding layer also includes second layers adjacent to the first layers and made of a TiCo phase and a metal Ti phase in which an average area ratio of the TiCo phase is 50 to 95%, and a residual Ti layer.

4 Claims, 2 Drawing Sheets

(51) Int. Cl.
  *B32B 18/00* (2006.01)
  *C22C 29/08* (2006.01)
  *B23K 20/02* (2006.01)
  *B23B 27/18* (2006.01)
  *B22F 3/14* (2006.01)

(52) U.S. Cl.
  CPC ............... *C22C 29/08* (2013.01); *B22F 3/14* (2013.01); *B22F 2302/10* (2013.01); *B22F 2998/10* (2013.01)

(56) References Cited

U.S. PATENT DOCUMENTS

| | | | | |
|---|---|---|---|---|
| 5,494,635 | A | * | 2/1996 | Bennett .................. C22C 1/051 419/14 |
| 2007/0290545 | A1 | | 12/2007 | Hall et al. |
| 2015/0056463 | A1 | * | 2/2015 | Jansson .................. B22F 7/062 428/548 |
| 2017/0120344 | A1 | * | 5/2017 | Igarashi .................. B23B 27/18 |

FOREIGN PATENT DOCUMENTS

| | | |
|---|---|---|
| JP | 2009-241236 A | 10/2009 |
| JP | 2012-111187 A | 6/2012 |
| JP | 2014-131819 A | 7/2014 |
| JP | 2015-142941 A | 8/2015 |

\* cited by examiner

COMPOSITE PART AND CUTTING TOOL

CROSS-REFERENCE TO RELATED PATENT APPLICATIONS

This application is a U.S. National Phase Application under 35 U.S.C. § 371 of International Patent Application No. PCT/JP2016/075425, filed Aug. 31, 2016, and claims the benefit of Japanese Patent Application No. 2015-170656, filed Aug. 31, 2015, and Japanese Patent Application No. 2016-165182, filed Aug. 25, 2016, all of which are incorporated herein by reference in their entirety. The International Application was published in Japanese on Mar. 9, 2017 as International Publication No. WO/2017/038855 under PCT Article 21(2).

FIELD OF THE INVENTION

The present invention relates to a composite member having excellent bonding strength of a bonding portion and a cutting tool, and particularly relates to a composite member in which a WC-based cemented carbide and a WC-based cemented carbide are bonded, and furthermore, to a cutting tool made of the composite member.

BACKGROUND OF THE INVENTION

Conventionally, WC-based cemented carbides, TiCN-based cermets, cBN sintered materials, and the like are well known as tool materials, but in recent years, a tool material formed of a composite member has been proposed instead of forming a tool material with a single material.

For example, Japanese Unexamined Publication No. 2009-241236 proposes a bonded body including a cermet sintered material as a first bonded material 1 and a cBN sintered material or a diamond sintered material as a second bonded material 3, in which bonding is performed between the first bonded material and the second bonded material via a bonding material 2 which does not generate a liquid phase when a temperature is less than 1000° C., by electrically heating while applying a pressure of 0.1 MPa to 200 MPa, and since a bonding layer does not decrease in bonding strength even at a high temperature exceeding a temperature at which a brazing material generates a liquid phase during cutting, the bonded body obtained by the method described above is suitable for high-speed cutting tools or CVD coated cutting tools.

Further, Japanese Unexamined Publication No. 2012-111187 proposes obtaining a bonded body for a cutting tool or the like having a high bonding strength, in a bonded body including a cemented carbide sintered material as a first bonded material 1 and a cBN sintered material as a second bonded material 2, in which bonding is performed at least two surfaces including a back surface and a bottom surface of the second bonded material between the first bonded material and the second bonded material via a bonding material 3 containing titanium (Ti), by forming a titanium nitride (TiN) compound layer having a thickness of 10 to 300 nm at an interface between the second bonded material and a bonding material, and by making a thickness of the bonding layer of the back surface less than a thickness of the bonding layer of the bottom surface.

Further, Japanese Unexamined Patent Application, First Publication No. 2014-131819 proposes enhancing bonding strength of a composite body, in a composite body including a cBN material containing cBN at 20 to 100% by mass, and a hard alloy formed of a hard phase at 50 to 97% by mass formed of at least one selected from the group consisting of carbides of Ti, Zr, Hf, V, Nb, Ta, Cr, Mo and W, carbonitrides thereof and mutual solid solutions thereof, and a binder phase as the balance, at 3 to 50% by mass of which a main component is at least one selected from the group consisting of Co, Ni, and Fe, by providing a bonding layer between the cBN sintered material and the hard alloy, by forming the bonding layer with a ceramic phase and a metal phase, and by setting a thickness of the bonding layer to 2 to 30 µm.

Although the composite materials proposed in Japanese Unexamined Publication No. 2009-241236, Japanese Unexamined Publication No. 2012-111187 and Japanese Unexamined Publication No. 2014-131819 described above or cutting tools made thereof exhibit a certain level of performance in cutting under normal conditions, in heavy cutting condition, for example, a high-feed rate and large depth of cut, in which a high load is exerted on a cutting edge, bonding strength cannot be said to be sufficient and there is a likelihood of breakage from the bonding portion.

Therefore, a composite member having even higher bonding strength of a bonding portion which does not cause breakage at the bonding portion even under heavy cutting conditions in which a high load is exerted on the cutting edge, and a cutting tool made thereof, are desired.

In order to solve the problems of the conventional composite member and a cutting tool made thereof, in a composite member formed of a WC-based cemented carbide and a WC-based cemented carbide and in a cutting tool made of the composite member, for example, in a cutting tool in which a cutting edge portion formed of a composite sintered material obtained by bonding a WC-based cemented carbide (backing material) simultaneously with sintering of a cBN sintered material at the time of ultrahigh pressure high temperature sintering and a WC-based cemented carbide tool body (base body) are bonded via a bonding member, as a result of intensive research on measures to improve the bonding strength of the bonding portion, the inventors of the present application made the following discoveries.

One WC-based cemented carbide member (hereinafter referred to as "WC-based cemented carbide member A") and the other WC-based cemented carbide member (hereinafter referred to as a "WC-based cemented carbide member B") are bonded via a bonding member made of a Ti foil. In the composite member in which the WC-based cemented carbide member A and the WC-based cemented carbide member B are bonded via a bonding layer, a first A layer including a TiC phase and a metal W phase is formed as the bonding layer adjacent to the WC-based cemented carbide member A, a second A layer including a TiCo phase and a metal Ti phase is formed adjacent to the first A layer, and, similarly in the WC-based cemented carbide member B, a first B layer including a TiC phase and a metal W phase is formed as the bonding layer adjacent to the WC-based cemented carbide member B, a second B layer including a TiCo phase and a metal Ti phase is formed adjacent to the first B layer, and, furthermore, a residual Ti layer is formed in a central region of the bonding layer sandwiched between the second A layer and the second B layer. In the composite member in which the WC-based cemented carbide member A, the first A layer, the second A layer, the residual Ti layer, the second B layer, the first B layer, and the WC-based cemented carbide member B are bonded in this order, when an area ratio of the TiC phase and a layer thickness in the first A layer and the first B layer, and an area ratio of the TiCo phase and a layer thickness in the second A layer and the second B layer are maintained within an appropriate range, adhesion strength and bonding strength between the WC-based cemented carbide member and the bonding layer can be enhanced.

Further, it has been found that the adhesion strength and bonding strength between the WC-based cemented carbide member and the bonding layer can be further enhanced when the area ratio occupied by the TiC phase in the first A layer increases gradually from the WC-based cemented carbide member A side toward the second A layer side and when the area ratio occupied by the TiC phase in the first B layer increases gradually from the WC-based cemented carbide member B side toward the second B layer side.

Therefore, it has been found that when the composite member is used as a material for a cutting tool, occurrence of breakage from the bonding portion can be prevented and excellent cutting performance can be exhibited for long-term usage, even when it is used for heavy cutting of steel or cast iron in which a high load is exerted on a cutting edge.

SUMMARY OF THE INVENTION

The present invention has been made on the basis of the above findings and has the following aspects.

(1) A composite member including a WC-based cemented carbide member A, a WC-based cemented carbide member B, and a bonding layer, the WC-based cemented carbide member A and the WC-based cemented carbide member B being bonded each other via the bonding layer, wherein (a) a first A layer made of a TiC phase and a metal W phase is formed adjacent to the WC-based cemented carbide member A, an average area ratio of the TiC phase in the first A layer being 40% to 60%, and a thickness of the first A layer being 0.5 μm to 3 μm, (b) a second A layer made of a TiCo phase and a metal Ti phase is formed adjacent to the first A layer, an average area ratio of the TiCo phase in the second A layer being 50% to 95%, and a thickness of the second A layer being 0.5 μm to 3 μm, (c) a first B layer made of a TiC phase and a metal W phase is formed adjacent to the WC-based cemented carbide member B, an average area ratio of the TiC phase in the first B layer being 40% to 60%, and a thickness of the first B layer being 0.5 μm to 3 μm, (d) a second B layer made of a TiCo phase and a metal Ti phase is formed adjacent to the first B layer, an average area ratio of the TiCo phase in the second B layer being 50% to 95%, and a thickness of the second B layer being 0.5 μm to 3 μm, and (e) a residual Ti layer is present in a central region of the bonding layer sandwiched between the second A layer and the second B layer, and the WC-based cemented carbide member A, the first A layer, the second A layer, the residual Ti layer, the second B layer, the first B layer, the WC-based cemented carbide member B are bonded in this order.

(2) The composite member according to the above-described (1), wherein an area ratio occupied by the metal W phase in the first A layer gradually decreases from the WC-based cemented carbide member A side toward the second A layer side, or an area ratio occupied by the metal W phase in the first B layer gradually decreases from the WC-based cemented carbide member B side toward the second B layer side.

(3) The composite member according to the above-described (1), wherein an area ratio occupied by the metal W phase in the first A layer gradually decreases from the WC-based cemented carbide member A side toward the second A layer side, and an area ratio occupied by the metal W phase in the first B layer gradually decreases from the WC-based cemented carbide member B side toward the second B layer side.

(4) A cutting tool constituted by a composite member according to any one of the above-described (1) to (3).

Hereinafter, the present invention will be described in detail.

As illustrated in FIG. 1, a bonding member (3) is disposed between the WC-based cemented carbide member A (1) and the WC-based cemented carbide member B (2) (see FIG. 1 (a)), the WC-based cemented carbide member A (1) and the WC-based cemented carbide member B (2) abut each other via the bonding member (3), the WC-based cemented carbide members (1, 2) and the bonding member (3) are bonded together through solid phase diffusion at a predetermined temperature and for a predetermined time in a state in which a predetermined pressure is applied (refer to FIG. 1 (b)), and thereby a composite member (6) of one aspect of the present invention (hereinafter referred to as "composite member of the present invention") in which the WC-based cemented carbide members (1, 2) are bonded to each other via a bonding layer (7) can be manufactured (See FIG. 1 (c)).

In FIG. 2, which is an enlarged schematic view of FIG. 1 (c), a first A layer (8) is formed adjacent to the WC-based cemented carbide member A (1) and a second A layer (9) is formed adjacent to the first A layer (8).

In addition, a first B layer (12) is formed adjacent to the WC-based cemented carbide member B (2) and a second B layer (11) is formed adjacent to the first B layer (12).

Further, a residual Ti layer (10) is present in a central region of the bonding layer (7) sandwiched between the second A layer (9) and the second B layer (11).

Then, the composite member (6) in which the WC-based cemented carbide member A (1), the first A layer (8), the second A layer (9), the residual Ti layer (10), the second B layer (11), the first B layer (12), the WC-based cemented carbide member B (2) are bonded in this order is formed.

The bonding layer (7) referred to in the present specification is the entire layer including the first A layer (8), the second A layer (9), the residual Ti layer (10), the second B layer (11) and the first B layer (12) which are formed between the WC-based cemented carbide member A (1) and the WC-based cemented carbide member B (2).

The solid phase diffusion bonding described above in the present specification is the following bonding method.

That is, the WC-based cemented carbide member (1) and the WC-based cemented carbide member (2) abut each other via the bonding member (3) and are held at a predetermined temperature for a predetermined time in a state in which a predetermined pressure is applied, and thereby the bonding member and the WC-based cemented carbide component are reacted to form an alloy. At this time, by appropriately controlling the composition and layer thickness of each layer constituting the bonding layer (7), a bonding with excellent strength can be obtained.

In solid phase diffusion bonding between the WC-based cemented carbide members (1, 2) using the bonding member (3), conditions such as a melting point of the bonding member (3) itself being relatively high (1200° C. or higher), the bonding member (3) reacting with the WC-based cemented carbide at 1000° C. or lower, a reaction being able to be controlled so that a brittle phase generated by the reaction does not lower strength of a bonding interface, the Kirkendall void generated due to imbalance in diffusion rate not being able to easily occur in the mutual diffusion of the WC-based cemented carbides (1, 2) and the bonding member (3), and the like are required.

In the present invention, a Ti foil is used as the bonding member (3) that meets such requirements.

In the manufacturing of the composite member (6) of the present invention, since the WC-based cemented carbide members (1, 2) and the bonding member (3) are performed solid phase diffusion bonding, layers that differ in component composition, that is, each of the first A layer (8), the second A layer (9), the residual Ti layer (10), the second B layer (11), and the first B layer (12), are formed from the WC-based cemented carbide member A (1) toward the WC-based cemented carbide member B (2) in the bonding layer (7) of the composite member (6) that is finally formed.

Then, the first A layer (8) formed adjacent to the WC-based cemented carbide member A (1) and the first B layer (12) formed adjacent to the WC-based cemented carbide member B (2) (hereinafter, the first A layer and the first B layer are collectively referred to as a "first layer" in some cases) are the first layer made of a TiC phase and a metal W phase, in which an average area ratio occupied by the TiC phase in the first layer is set to 40 to 60%, and a thickness of the first layer is set to 0.5 μm to 3 μm.

Further, the second A layer (9) is formed adjacent to the first A layer (8) and the second B layer (11) is formed adjacent to the first B layer (12) (hereinafter, the second A layer and the second B layer are collectively referred to as a "second layer" in some cases), in which the second layer is made of a TiCo phase and a metal Ti phase, an average area ratio occupied by the TiCo phase in the second layer is set to 50 to 95%, and a thickness of the second layer is set to 0.5 μm to 3 μm.

Here, since the metal W phase in the first layer has a smaller thermal expansion coefficient than the WC-based cemented carbide, and the TiC phase in the first layer has a thermal expansion coefficient larger than that of the WC-based cemented carbide and smaller than that of the metal Ti, an apparent thermal expansion coefficient of the first layer has an intermediate value between the WC-based cemented carbide and the metal Ti.

Therefore, when the first layer including the TiC phase and the metal W phase is formed adjacent to the WC-based cemented carbide, thermal stress generated at the time of bonding between the WC-based cemented carbide (1, 2) and the bonding layer (7) due to a difference in thermal expansion coefficient is alleviated and formation of residual stress is also inhibited.

In order for the first layer to have such a thermal expansion coefficient, it is necessary to set an average area ratio occupied by the TiC phase in the first layer to 40 to 60%.

This is because, when the average area ratio of the TiC phase is less than 40% or exceeds 60%, the first layer cannot sufficiently accomplish a function of stress alleviation.

A layer thickness of the first layer is set to 0.5 μm to 3 μm because, when the layer thickness of the first layer is less than 0.5 μm, sufficient stress alleviation cannot be achieved, and when the layer thickness exceeds 3 μm, brittleness of the first layer becomes obvious, cracks are generated when a high load is exerted on the bonding layer (7) of the composite member (6), which can easily become crack propagation paths, and thus it becomes impossible to maintain a strong bonded state with the WC-based cemented carbide.

Further, while the average area ratio of the TiC phase in the first layer is 40 to 60% as described above, within the range of the average area ratio of the TiC phase of 40 to 60% when the area ratio occupied by the metal W phase on the WC-based cemented carbide side is made relatively high and the area ratio occupied by the metal W phase is made to decrease gradually toward the second layer (or the residual Ti layer) side, since the thermal expansion coefficient also increases gradually from the WC-based cemented carbide side toward the second layer (or the residual Ti layer), a relatively smooth change in thermal expansion coefficient is formed in the first layer.

Therefore, in order to obtain the composite member (6) in a more sound bonding state without generating a large residual stress at the interface of each layer of the WC-based cemented carbide, the first layer, the second layer, and the residual Ti layer, the area ratio occupied by the metal W phase on the WC-based cemented carbide side is preferably made relatively high in the first layer and the area ratio occupied by the metal W phase is preferably made to gradually decrease toward the second layer (or the residual Ti layer). Although it is effective when this effect of reducing the residual stress is achieved at either one of the first A layer (8) or the second B layer (11), since the effect of reducing the residual stress further increases when the area ratio occupied by the metal W phase on the WC-based cemented carbide side is made relatively high and the area ratio occupied by the metal W phase is made to gradually decrease toward the second layer (or the residual Ti layer) in both the first A layer (8) and the second B layer (11) in the first layer, it is preferable to form the above-described structure in both the first A layer (8) and the second B layer (11).

As described above, the layers including the TiCo phase and the metal Ti phase is formed as the second layer in the bonding layer (7), in which formation of the TiCo phase prevents precipitation of a metal Co phase having a large thermal expansion coefficient and thus allows stress alleviation, and presence of the metal Ti phase exhibits an effect of alleviating a difference in thermal expansion coefficient with the residual Ti layer (10) positioned approximately at a center of the first layer and the bonding layer (7).

However, when an average area ratio occupied by the TiCo phase in the second layer is less than 50%, precipitation of metal Co cannot be avoided, thermal stress is locally generated due to the metal Co present in the second layer, and thereby it tends to be a starting point of peeling in the second layer. On the other hand, when the average area ratio occupied by the TiCo phase in the second layer exceeds 95%, the effect of alleviating thermal stress between the first layer and the residual Ti layer (10) is not sufficiently exhibited.

Therefore, the average area ratio occupied by the TiCo phase in the second layer is set to 50 to 95%.

In addition, when a layer thickness of the second layer is less than 0.5 μm, sufficient stress alleviation cannot be achieved. On the other hand, when the layer thickness exceeds 3 μm, brittleness of the second layer becomes obvious, cracks are generated when a high load is exerted on the bonding layer (7) of the composite member (6), which can easily become crack propagation paths, and thus it becomes impossible to maintain a strong bonded state with the WC-based cemented carbide, and therefore the layer thickness of the second layer is set to 0.5 μm to 3 μm.

At a substantially central portion of the bonding layer (7), that is, a portion sandwiched between the second A layer (9) and the second B layer (11), the residual Ti layer (10) that has not reacted in the solid phase diffusion bonding is residually formed.

As described above, the first layer and the second layer which have a stress alleviation effect of the bonding layer (7) are both formed with a thickness of 0.5 μm to 3 μm, but when the solid phase diffusion bonding condition exceeds an appropriate range, a formation reaction of the TiC phase of the first layer or the TiCo phase of the second layer is excessively promoted and the residual Ti layer (10) disappears, and as a result, embrittlement of the layer and local thermal stress are caused, and thereby strength of the bonding layer (7) decreases.

In order to avoid such an adverse effect, it is important to leave the Ti layer with an appropriate thickness at substantially a central portion of the bonding layer (7) sandwiched between the second A layer (9) and the second B layer (11).

Although it depends on solid phase diffusion bonding conditions such as a bonding temperature, a bonding time, a pressure, and the like, a Ti foil having a thickness of 4 μm to 50 μm can be used as the bonding member (3). In this case, it is preferable that the layer thickness of the residual Ti layer (10) be 2 μm to 40 μm.

The composite member (6) of the present invention can be manufactured, for example, by the following methods.

First, blast processing is performed on each of bonding surfaces of the WC-based cemented carbide member A (1) and the WC-based cemented carbide member B (2) to perform pretreatment for introducing distortion to the bonding surfaces.

Next, a Ti foil serving as the bonding member (3) is sandwiched between the WC-based cemented carbide member A (1) and the WC-based cemented carbide member B (2), which are then held in a vacuum at a predetermined temperature of 600 to 900° C. for 5 to 600 minutes and pressurized at a pressure of 0.5 to 10 MPa to perform solid phase diffusion bonding, and thereby the composite member (6) in which the WC-based cemented carbide member A (1) and the WC-based cemented carbide member B (2) are bonded via the bonding layer (7) can be manufactured.

Here, by performing the pretreatment for introducing distortion to the bonding surfaces of the WC-based cemented carbide members (1, 2), distortion of WC and Co is alleviated at the time of bonding and at the same time reactions between WC and Ti and between Co and Ti are accelerated, which allows a uniform reaction to be realized even under a relatively low temperature condition of 600 to 900° C., and thereby a first layer including a TiC phase and a metal W phase and a second layer including a TiCo phase and a metal Ti phase are formed with a predetermined layer thickness, and the residual Ti layer (10) is residually formed at substantially a central portion of the bonding layer (7) sandwiched between the second A layer (9) and the second B layer (11).

For instance, the composite member (6) of the present invention can constitute a cutting tool by using the WC-based cemented carbide member A (1) as a cutting edge side and using the WC-based cemented carbide member B (2) as a tool body.

That is, when the WC-based cemented carbide member A (1) of the composite member (6) is used as a backing material of the cBN sintered material which is a cutting edge portion side and the WC-based cemented carbide member B (2) thereof is used as a tool body (base body), a cBN cutting tool can be formed.

As a method of measuring the bonding layer (7) of the composite member (6) of the present invention, the bonding layer is observed in a vertical cross section using a scanning electron microscope and an energy dispersive X-ray spectrometer, and element mapping is performed in a range of plus and minus 100 μm in a direction perpendicular to the interface with the interfaces between the WC-based cemented carbide members (1, 2) and the bonding layer as the center. On the basis of the mapping result, portions at which WC, Co, metal W, TiC, metal Ti, and TiCo are present is identified, a portion at which WC and Co are present is referred to as the cemented carbide member, a portion at which metal W and TiC are present is referred to as the first layer, a portion at which metal Ti and TiCo are present is referred to as the second layer, and a portion at which metal Ti is mainly present is referred to as the residual Ti layer. Ten straight lines perpendicular to abutting surfaces of the WC-based cemented carbide members (1, 2) are drawn at intervals of 1 μm or more and distances of these straight lines traversing each layer are averaged to obtain a thickness of each layer. In addition, from the mapping result, the first layer and the second layer were separated and extracted by image processing, and an area ratio occupied by the TiC phase in the first layer and an area ratio occupied by the TiCo phase in the second layer were obtained.

Further, by measuring the area ratio of the TiC phase in a layer thickness direction in the first layer, a change in the area ratio of the metal W phase in the first layer can be obtained.

Advantageous Effects of Invention

The present invention is a composite member in which the WC-based cemented carbide member A and the WC-based cemented carbide member B are bonded via a bonding layer formed by solid phase diffusion bonding using a Ti foil as a bonding member, in which the bonding layer is formed of a first layer including a TiC phase and a metal W phase, a second layer including a TiCo phase and a metal Ti phase, and a residual Ti layer, and has excellent bonding strength between the WC-based cemented carbide member A, the bonding layer, and the WC-based cemented carbide member B because internal residual stress is reduced as small as possible by identifying phases formed at each of the layers and controlling the thermal expansion coefficient over the entire composite member, and as a result, strength of the composite member as a whole also is enhanced, and breakage does not occur in the bonding layer portion even when a high load is exerted on the composite member.

Therefore, since a cutting tool constituted by the composite member described above does not break from the bonding layer portion even when the cutting tool is used for heavy cutting in which a high load is exerted on a cutting edge, the cutting tool exhibits excellent cutting performance for long-term usage.

BRIEF DESCRIPTION OF THE DRAWINGS

In FIG. 3, W content is large at an upper layer side and the W content decreases toward a lower layer side.

DETAILED DESCRIPTION OF THE INVENTION

Figure 1:
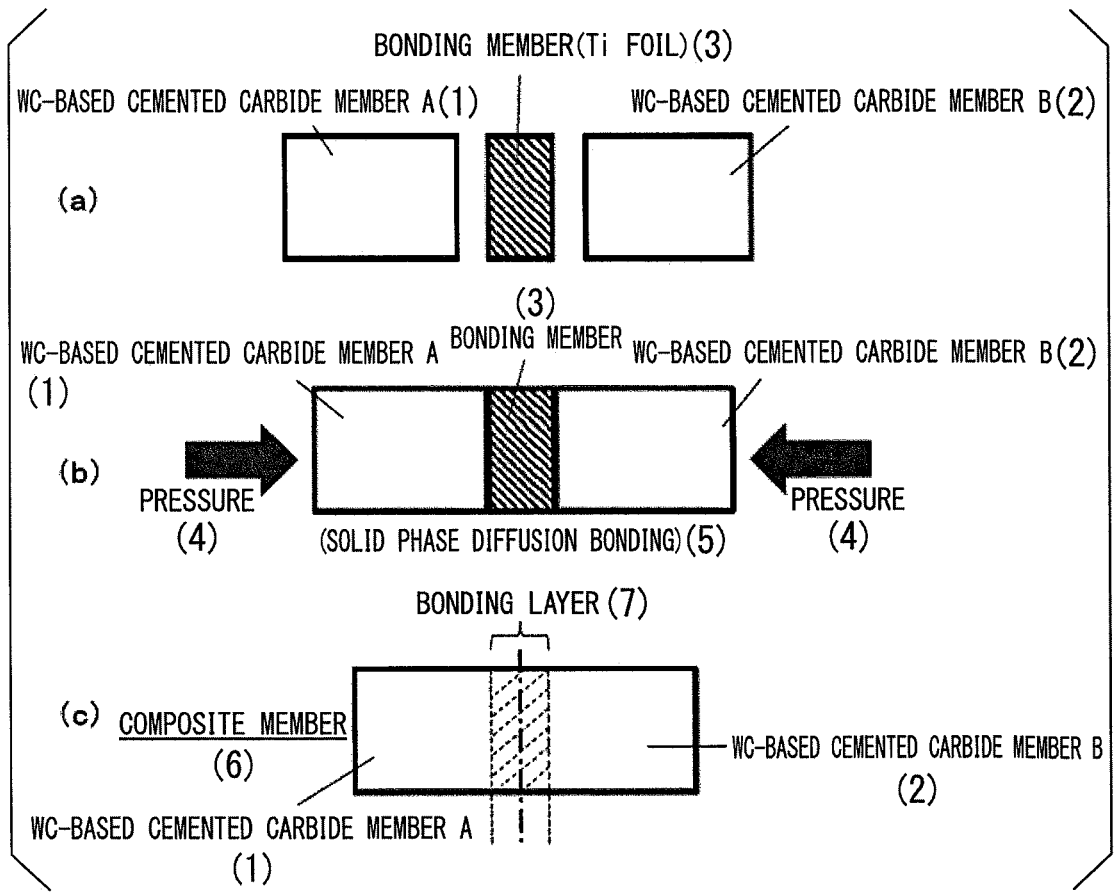
FIG. 1 is a schematic view illustrating a manufacturing process of a composite member of the present invention, in which (a) illustrates the composite member before bonding, (b) illustrates the composite member at the time of solid phase diffusion bonding, and (c) illustrates the composite member after the bonding.
Figure 2:
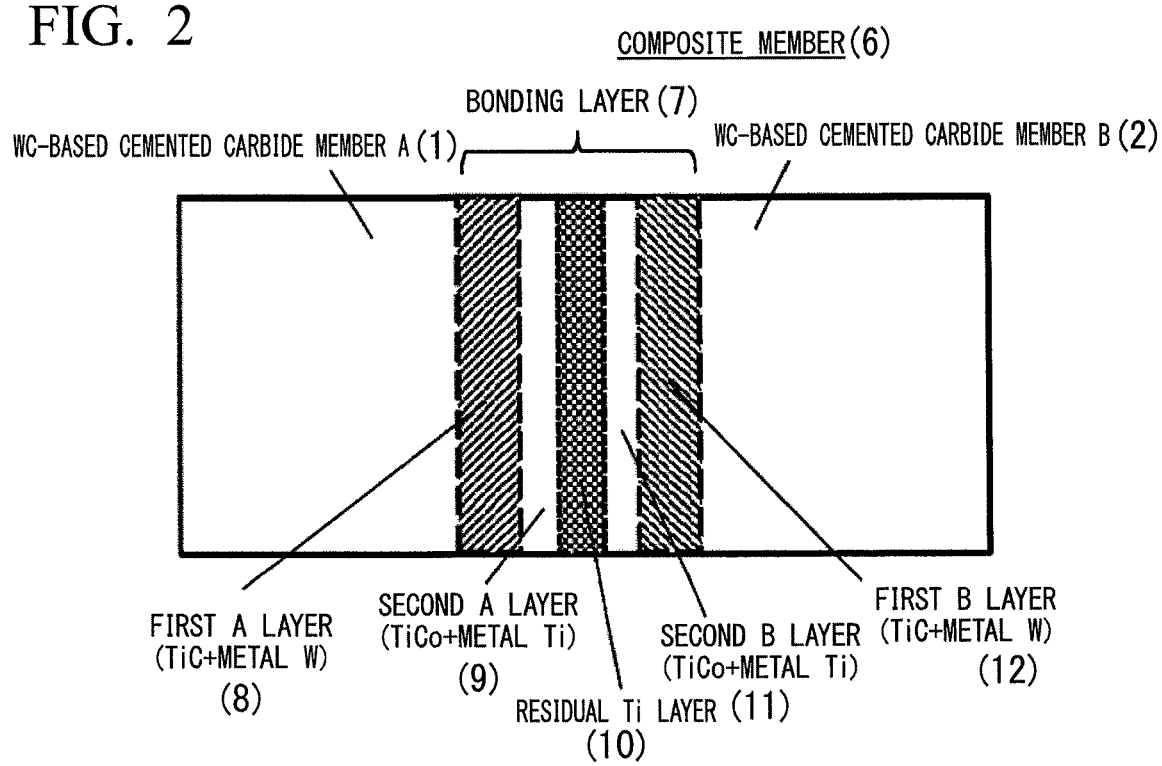
FIG. 2 illustrates an enlarged schematic view of FIG. 1 (*c*).

Hereinafter, the present invention will be described in detail on the basis of an example. The example described below is one embodiment of the present invention, and the present invention is not limited thereto.

EXAMPLE

A WC powder, a VC powder, a TaC powder, a NbC powder, a $Cr_3C_2$ powder and a Co powder, which had an average grain size of 0.5 μm to 1 μm, were prepared as raw powders, these raw powders were blended according to a composition formulation shown in Table 1, wet-blended for 24 hours in a ball mill, dried, and press-molded into a green compact under a pressure of 100 MPa, and then this green compact was sintered in a vacuum of 6 Pa at a temperature of 1400° C. for a holding time of 1 hour to form four kinds of WC-based cemented carbide sintered materials (hereinafter simply referred to as "cemented carbide") A-1 to A-4.

TABLE 1

| Types | | Co | TaC | NbC | VC | $Cr_3C_2$ | WC |
|---|---|---|---|---|---|---|---|
| Cemented carbide | A-1 | 12 | | | | | balance |
| | A-2 | 10 | | 1 | | 0.5 | balance |
| | A-3 | 12 | | | | 0.7 | balance |
| | A-4 | 8 | 2 | 1 | | | balance |

Next, a cBN powder, a TiN powder, a TiCN powder, a $TiB_2$ powder, a TiC powder, an MN powder, and an $Al_2O_3$ powder, which had an average grain size of 0.5 μm to 4 μm, were prepared as raw powders of a cBN sintered material, and these raw powders were blended according to a predetermined composition formulation, wet-blended for 24 hours using acetone in a ball mill, dried, and then press-molded into green compacts having dimensions of 15 mm in diameter×1 mm in thickness at a pressure of 100 MPa.

Next, the cemented carbides A-1 to A-4 were formed into sintered materials having a diameter of 15 mm and a thickness of 2 mm and were used as a backing material at the time of sintering the cBN sintered material, the cBN green compacts were laminated on the backing material in a combination shown in Table 2, and then the laminates were sintered under conditions of a temperature of 1300° C., a pressure of 5.5 GPa, and a time of 30 minutes using an ultra-high pressure sintering apparatus to manufacture composite sintered materials B-1 to B-4.

Regarding composition of the cBN sintered materials of the composite sintered materials B-1 to B-4, an area % of the cBN was obtained as a volume % by image analysis of scanning electron microscope (SEM) observation results for polished surfaces of cBN sintered material cross sections.

For components other than the cBN, only components constituting a main binder phase and the other binder phases were confirmed. The results are shown in Table 2.

TABLE 2

| | | | | Sintered material composition | |
|---|---|---|---|---|---|
| Types | | Backing material | cBN (volume %) | Main binder phase | Other binder phase |
| Composite sintered material | B-1 | A-1 | 70 | TiN | $Al_2O_3$, $TiB_2$, AlN, inevitable impurities |
| | B-2 | A-2 | 76 | TiN | $Al_2O_3$, $TiB_2$, AlN, inevitable impurities |
| | B-3 | A-3 | 63 | TiCN | $Al_2O_3$, $TiB_2$, AlN, inevitable impurities |
| | B-4 | A-4 | 72 | TiC | $Al_2O_3$, $TiB_2$, AlN, inevitable impurities |

Next, Ti foils shown in Table 3 were prepared as bonding members.

Next, the bonding members between the cemented carbides A-1 to A-4 and the composite sintered materials B-1 to B-4 are shown in Table 3.

With the bonding members inserted and interposed, the composite sintered materials and the cemented carbides were pressurized and bonded under conditions shown in Table 4, that is, under conditions of using a Ti foil having a thickness of 1 μm to 50 μm as a bonding member, holding them at a predetermined temperature within a range of 600 to 900° C. for 5 to 600 minutes in a vacuum of $1\times10^{-3}$ Pa or less, and applying a pressure of 0.5 to 10 MPa, and thereby composite members 1 to 9 of the present invention shown in Table 6 were manufactured. Each of the composite sintered materials was disposed such that the cBN sintered material was on an outer surface and the backing material was on an inner surface, that is, disposed such that the WC-based cemented carbide serving as a backing material and the WC-based cemented carbide serving as a tool body (base body) were bonded via a bonding member.

For comparison, bonding members having the sizes shown in Table 3 were used and inserted and interposed between the cemented carbides A-1 to A-4 and composite sintered materials B-1 to B-4, respectively, and the composite sintered materials and the cemented carbides were pressurized and bonded under the conditions shown in Table 5 to manufacture composite members 1 to 10 of comparative examples shown in Table 7. A bonding arrangement of the composite sintered material was the same as that of the composite member of the present invention.

TABLE 3

| Types | Bonding member |
|---|---|
| C-1 | foil thickness Ti foil of 4 μm |
| C-2 | foil thickness Ti foil of 20 μm |
| C-3 | foil thickness Ti foil of 50 μm |
| C-4 | foil thickness Ti foil of 80 μm |
| C-5 | foil thickness Ti foil of 150 μm |
| C-6 | a brazing material having a composition of Ti 25%, Zr 25%, Cu 50% |

TABLE 4

| Types | | Composite | | | Bonding conditions | | | |
|---|---|---|---|---|---|---|---|---|
| | | Cemented carbide types | sintered material types | Bonding member types | Bonding temperature (°C.) | Holding time (min.) | Pressurizing load (MPa) | Atmosphere pressure (Pa) |
| Composite member of present invention | 1 | A-1 | B-1 | C-1 | 800 | 30 | 2 | $1 \times 10^{-3}$ |
| | 2 | A-2 | B-2 | C-2 | 700 | 120 | 5 | $1 \times 10^{-3}$ |
| | 3 | A-3 | B-3 | C-3 | 900 | 5 | 0.5 | $1 \times 10^{-1}$ |
| | 4 | A-4 | B-4 | C-1 | 600 | 600 | 10 | $1 \times 10^{-1}$ |
| | 5 | A-1 | B-4 | C-2 | 750 | 60 | 7 | $1 \times 10^{-3}$ |
| | 6 | A-2 | B-3 | C-3 | 650 | 300 | 3 | $1 \times 10^{-3}$ |
| | 7 | A-3 | B-2 | C-4 | 850 | 15 | 7 | $1 \times 10^{-1}$ |
| | 8 | A-4 | B-1 | C-2 | 700 | 180 | 5 | $1 \times 10^{-3}$ |
| | 9 | A-1 | B-2 | C-5 | 800 | 45 | 3 | $1 \times 10^{-3}$ |

TABLE 5

| Types | | Composite | | | Bonding conditions | | | |
|---|---|---|---|---|---|---|---|---|
| | | Cemented carbide types | sintered material types | Bonding member types | Bonding temperature (°C.) | Holding time (min.) | Pressurizing load (MPa) | Atmosphere pressure (Pa) |
| Composite member of comparative example | 1 | A-1 | B-1 | C-1 | 1000 | 5 | 2 | $1 \times 10^{-3}$ |
| | 2 | A-2 | B-2 | C-2 | 500 | 600 | 5 | $1 \times 10^{-3}$ |
| | 3 | A-3 | B-3 | C-3 | 600 | 1000 | 0.5 | $1 \times 10^{-1}$ |
| | 4 | A-4 | B-4 | C-1 | 900 | 2 | 10 | $1 \times 10^{-1}$ |
| | 5 | A-1 | B-4 | C-2 | 750 | 60 | 0 | $1 \times 10^{-3}$ |
| | 6 | A-2 | B-3 | C-3 | 650 | 300 | 0 | $1 \times 10^{-3}$ |
| | 7 | A-3 | B-2 | C-5 | 1000 | 30 | 7 | $1 \times 10^{-1}$ |
| | 8 | A-4 | B-1 | C-4 | 1000 | 120 | 5 | $1 \times 10^{-3}$ |
| | 9 | A-1 | B-2 | C-5 | 500 | 1200 | 3 | $1 \times 10^{-3}$ |
| | 10 | A-1 | B-1 | C-6 | 850 | 30 | 0 | $1 \times 10^{-3}$ |

High Temperature Shear Strength Measurement Test:

For the composite members 1 to 9 of the present invention and the composite members 1 to 10 of the comparative example manufactured above, a shear strength measurement test was performed to measure strength of the bonding portion.

Test pieces used for the test were obtained from the composite members 1 to 9 of the present invention and the composite members 1 to 10 of the comparative example by cutting the composite sintered material into a size of 1.5 mm (W)×1.5 mm (L)×0.75 mm (H) and by cutting the WC-based cemented carbide body (base body) into a size of 1.5 mm (W)×4.5 mm (L)×1.5 mm (H), and were used as the shear strength measurement test pieces.

Upper and lower surfaces of the test piece were gripped and fixed by a clamp, a load was applied near an approximate center of the upper surface of the test piece using a prismatic pressing piece made of cemented carbide with one side of 1.5 mm in an atmosphere temperature of 600° C., and a load at which the test piece broke was measured.

Table 6 and Table 7 show measured values of the shear strength.

In addition, for the composite members 1 to 9 of the present invention and the composite members 1 to 10 of the comparative example, a composition analysis of the vertical cross section of the bonding portion with the WC-based cemented carbide was performed using a scanning electron microscope and an energy dispersive X-ray spectrometer.

Figure 3:
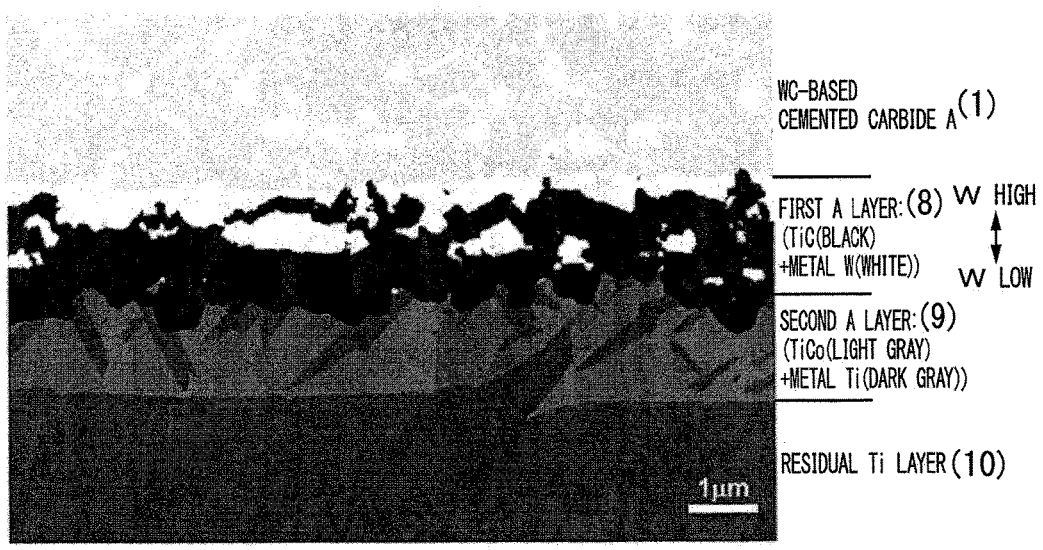
FIG. 3 is a schematic view showing a WC-based cemented carbide member, a first layer, a second layer, a residual Ti layer of the composite member of the present invention (an image used for element mapping in a vertical cross section). In the first layer (first A layer (8)), a black area and a white area correspond to TiC and metal W, respectively. In the second layer (second A layer (9)), a light gray area and a dark gray area correspond to TiCo and metal Ti, respectively.

FIG. 3 shows a schematic view of the WC-based cemented carbide member, a first layer, a second layer, a residual Ti layer of the composite member of the present invention (an image used for element mapping in the vertical cross section). In the first layer (first A layer (8)), a black area and a white area respectively correspond to TiC and metal W. In the second layer (second A layer (9)), a light gray area and a dark gray area respectively correspond to TiCo and metal Ti. In FIG. 3, a W content is high at an upper layer side and the W content decreases toward a lower layer side.

With an interface between the WC-based cemented carbide member and a bonding layer as the center, element mapping was performed in a range of plus and minus 100 μm in a direction perpendicular to the interface, by which a WC phase, a Co phase, a TiC phase, a metal W phase, a TiCo phase and a metal Ti phase were identified, and the cemented carbide member, the first layer, the second layer, and the residual Ti layer were identified. From the result of the element mapping, area ratios occupied by the TiC phase and the TiCo phase were measured.

Regarding the first layer, the first layer was divided into three equal sections of a cemented carbide member side layer, a central layer, and a second layer side layer in a thickness direction, and an area ratio of the metal W phase in each layer was obtained from the element mapping result.

Further, layer thicknesses of the first layer, the second layer and the residual Ti layer were obtained.

A central portion region of the bonding layer containing a Ti content exceeding 90 atomic % was identified as a residual Ti layer.

The first A layer, the second A layer, the residual Ti layer, and results of shear strength are shown in Tables 6 and 8. Measurement results of the first B layer and the second B layer are shown in Tables 7 and 9. Further, for the composite members 1 to 4 of the present invention and the composite members 1 to 4 and 10 of the comparative example, since the first A layer and the first B layer, and the second A layer and the second B layer were substantially equivalent, description of the first B layer and the second B layer was omitted.

TABLE 6

| Types | | Average area ratio of TiC phase (area %) | First A layer (TiC + metal W) | | | | Second A layer (TiCo + metal Ti) | | Residual Ti layer Layer thickness (μm) | Shear strength (MPa) |
|---|---|---|---|---|---|---|---|---|---|---|
| | | | Change in area ratio of metal W phase (area %) | | | Layer thickness (μm) | Average area ratio of TiCo phase (area %) | Layer thickness (μm) | | |
| | | | Carbide member side layer | Central layer | Second layer side layer | | | | | |
| Composite member of present invention | 1 | 45 | 72 | 50 | 46 | 1.8 | 62 | 1.7 | 0.4 | 300 |
| | 2 | 50 | 65 | 51 | 37 | 1.2 | 65 | 1.3 | 15.0 | 510 |
| | 3 | 53 | 47 | 48 | 47 | 3.0 | 50 | 3.0 | 40.0 | 320 |
| | 4 | 47 | 62 | 53 | 42 | 0.5 | 72 | 0.5 | 2.1 | 350 |
| | 5 | 40 | 71 | 60 | 51 | 1.3 | 80 | 1.3 | 15.0 | 470 |
| | 6 | 52 | 65 | 48 | 33 | 0.8 | 67 | 0.7 | 47.0 | 450 |
| | 7 | 60 | 50 | 39 | 30 | 2.3 | 95 | 2.2 | 71.0 | 350 |
| | 8 | 55 | 53 | 45 | 35 | 1.4 | 88 | 1.5 | 14.0 | 480 |
| | 9 | 50 | 65 | 48 | 36 | 2.0 | 75 | 2.1 | 142.0 | 330 |

TABLE 7

| Types | | Average area ratio of TiC phase (area %) | First B layer (TiC + metal W) | | | | Second B layer (TiCo + metal Ti) | |
|---|---|---|---|---|---|---|---|---|
| | | | Change in area ratio of metal W phase (area %) | | | Layer thickness (μm) | Average area ratio of TiCo phase (area %) | Layer thickness (μm) |
| | | | Carbide member side layer | Central layer | Second layer side layer | | | |
| Composite member of present invention | 5 | 43 | 70 | 57 | 48 | 1.1 | 74 | 1.1 |
| | 6 | 51 | 66 | 49 | 34 | 0.9 | 69 | 0.9 |
| | 7 | 59 | 51 | 41 | 33 | 2.1 | 92 | 2.0 |
| | 8 | 51 | 55 | 49 | 38 | 1.9 | 90 | 2.1 |
| | 9 | 52 | 63 | 48 | 35 | 1.8 | 72 | 1.9 |

TABLE 8

| Types | | Average area ratio of TiC phase (area %) | First A layer (TiC + metal W) | | | | Second A layer (TiCo + metal Ti) | | Residual Ti layer Layer thickness (μm) | Shear strength (MPa) |
|---|---|---|---|---|---|---|---|---|---|---|
| | | | Change in area ratio of metal W phase (area %) | | | Layer thickness (μm) | Average area ratio of TiCo phase (area %) | Layer thickness (μm) | | |
| | | | carbide member side | center of first layer | second layer side | | | | | |
| Composite member of comparative example | 1 | 30 | 68 | 66 | 72 | 1.5 | 43 | 1.5 | 0 | 150 |
| | 2 | 68 | 10 | 35 | 50 | 0.5 | 95 | 0.5 | 18 | 270 |
| | 3 | 77 | 23 | 22 | 23 | 3 | 98 | 3 | 38 | 220 |
| | 4 | 31 | 70 | 70 | 67 | 1.5 | 38 | 1.5 | 0 | 230 |
| | 5 | 41 | 59 | 60 | 59 | 0.3 | 80 | 0.3 | 19 | 210 |
| | 6 | 52 | 49 | 48 | 49 | 0.2 | 67 | 0.2 | 49 | 190 |
| | 7 | 25 | 75 | 70 | 76 | 5 | 42 | 5 | 133 | 130 |
| | 8 | 40 | 59 | 60 | 62 | 20 | 50 | 20 | 10 | 180 |
| | 9 | 80 | 19 | 12 | 30 | 0.5 | 97 | 0.5 | 148 | 200 |
| | 10 | — | — | — | — | — | — | — | — | 250 |

TABLE 9

| | | Bonding layer | | | | | |
|---|---|---|---|---|---|---|---|
| | | First B layer (TiC + metal W) | | | | Second B layer (TiCo + metal Ti) | |
| | | Average area ratio of TiC phase (area %) | Change in area ratio of metal W phase (area %) | | | Average area ratio of TiCo phase (area %) | Layer thickness (μm) |
| Types | | | carbide member side | center of first layer | second layer side | Layer thickness (μm) | |
| Composite member of comparative example | 5 | 43 | 61 | 57 | 61 | 0.2 | 78 | 0.2 |
| | 6 | 54 | 45 | 46 | 45 | 0.3 | 71 | 0.3 |
| | 7 | 22 | 80 | 78 | 75 | 4.8 | 40 | 4.7 |
| | 8 | 44 | 54 | 56 | 58 | 18 | 47 | 18 |
| | 9 | 78 | 24 | 22 | 21 | 0.3 | 95 | 0.3 |

Next, cutting tools made of the composite members 1 to 9 of the present invention and the composite members 1 to 10 of the comparative example were manufactured, and presence or absence of occurrence of breakage in cutting was investigated.

The cutting tools made of the composite members were manufactured as below.

The composite sintered materials B-1 to B-4 manufactured above were cut into dimensions of a planar shape of an isosceles triangle having a side of 4 mm at an insert included angle of 80°, and a thickness of 2 mm Subsequently, the cemented carbides A-1 to A-4 were formed into a sintered material having dimensions of a planar shape of a rhombus having a diameter of an inscribed circle of 12.7 mm at an insert included angle of 80° and a thickness of 4.76 mm, and a notch having a size corresponding to a shape of the composite sintered material was formed using a grinding machine at one corner of any surface in upper and lower surfaces parallel to each other in the sintered material. An area of a bottom surface of this notch was 2.96 mm² and an area of a side surface was 4.89 mm². Next, the bonding members shown in Table 3 were inserted and interposed between the cemented carbides A-1 to A-4 and the composite sintered materials B-1 to B-4, the composite sintered materials and the WC-based cemented carbides were pressurized and bonded under conditions shown in Table 4, the composite member was subjected to outer periphery polishing processing, then cutting edge portion was subjected to honing processing of R: 0.07 mm, and thereby cutting tools 1 to 9 of the present invention having an insert shape of ISO standard • CNGA 120408 were manufactured.

Further, the composite sintered material was disposed such that the cBN sintered material was on the outer surface and the backing material was on the inner surface, that is, the backing material and the tool body (base body) were bonded via the bonding member.

In addition, it was confirmed that the bonding portions of the cutting tools 1 to 9 of the present invention were substantially the same as the composite members 1 to 9 of the present invention shown in Table 6.

Similarly, the bonding members shown in Table 3 were inserted and interposed between the composite sintered materials B-1 to B-4 manufactured above and the cemented carbides A-1 to A-4 manufactured above, which were pressurized and bonded under the conditions shown in Table 5 to manufacture cutting tools 1 to 10 of the comparative example.

In addition, it was confirmed that the bonding portions of the cutting tools 1 to 10 of the comparative example were substantially the same as the composite members 1 to 10 of the comparative example shown in Table 7.

Next, in a state in which all the above various types of cutting tools were each screwed to a distal end portion of an insert holder of tool steel using a fixing jig, a dry high-speed cutting test of carburized steel to be described below was performed on the cutting tools 1 to 9 of the present invention and the cutting tools 1 to 10 of the comparative example, and falling of a cutting edge tip and a location of the broken part were observed.

Work Material: Round bar of JIS•SCM 415 (hardness: 58 HRc)
Cutting speed: 250 m/min,
Depth of cut: 0.4 mm,
Feed: 0.2 mm/rev.,
Cutting time: 16 minutes,
(Normal cutting speed is 150 m/min),
Results of the cutting test are shown in Table 10.

TABLE 10

| Types | Falling of a cutting edge tip | | Types | Falling of a cutting edge tip | | Breakage location |
|---|---|---|---|---|---|---|
| Tools of present invention | 1 | No | Tools of comparative examples | 1 | Yes | Interface between first layer and second layer |
| | 2 | No | | 2 | Yes | Interface between first layer and cemented carbide member |
| | 3 | No | | 3 | Yes | Interface between first layer and cemented carbide member |
| | 4 | No | | 4 | Yes | Interface between second layer and residual Ti layer |
| | 5 | No | | 5 | Yes | Interface between first layer and cemented carbide member |

TABLE 10-continued

| Types | Falling of a cutting edge tip | Types | Falling of a cutting edge tip | Breakage location |
|---|---|---|---|---|
| 6 | No | 6 | Yes | Interface between first layer and cemented carbide member |
| 7 | No | 7 | Yes | Interface between first layer and second layer |
| 8 | No | 8 | Yes | Interface between second layer and residual Ti layer |
| 9 | No | 9 | Yes | Interface between first layer and cemented carbide member |
|  |  | 10 | Yes | Inside brazing material |

From values of the shear strength shown in Tables 6 and 8, it was understood that the composite members 1 to 9 of the present invention have superior bonding strengths as compared with the composite members 1 to 10 of the comparative example.

Also, it was understood from results shown in Table 10, the cutting tools 1 to 9 of the present invention formed of the composite members 1 to 9 of the present invention exhibit excellent cutting performance for long-term usage without the cutting edge tip falling, while the cutting tools 1 to 10 of the comparative example formed of the composite members 1 to 10 of the comparative example show that each of the cutting edge tips falls from the bonding portion during cutting and the tool life comes to an end at an early stage.

Although a specific description using the insert as an example was presented in the present embodiment, the present invention is not limited to the insert, and can be applied to all cutting tools having a bonding portion between a cutting edge portion and a tool body such as a drill, an end mill, or the like, and can be applied to an excavating tool such as a bit.

INDUSTRIAL APPLICABILITY

The composite member of the present invention has high bonding strength, and the cutting tool manufactured from the composite member can be used for high load cutting of various kinds of steel or cast iron, and furthermore, since the cutting tool exhibits stable cutting performance for long-term usage, it can satisfy requirements of high performance of a cutting apparatus, labor saving of cutting, energy saving, and also cost reduction.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: WC-based cemented carbide member A
2: WC-based cemented carbide member B
3: Bonding member (Ti foil)
4: Pressure
5: Solid phase diffusion bonding
6: Composite member
7: Bonding layer
8: First A layer (TiC+metal W)
9: Second A layer (TiCo+metal Ti)
10: Residual Ti layer
11: Second B layer (TiCo+metal Ti)
12: First B layer (TiC+metal W)

What is claimed is:

1. A composite member comprising:
a WC-based cemented carbide member A;
a WC-based cemented carbide member B; and
a bonding layer, the WC-based cemented carbide member A and the WC-based cemented carbide member B being bonded to each other via the bonding layer, wherein
(a) a first A layer made of a TiC phase and a metal W phase is formed adjacent to the WC-based cemented carbide member A, an average area ratio of the TiC phase in the first A layer being 40% to 60%, and a thickness of the first A layer being 0.5 μm to 3 μm,
(b) a second A layer made of a TiCo phase and a metal Ti phase is formed adjacent to the first A layer, an average area ratio of the TiCo phase in the second A layer being 50% to 95%, and a thickness of the second A layer being 0.5 μm to 3 μm,
(c) a first B layer made of a TiC phase and a metal W phase is formed adjacent to the WC-based cemented carbide member B, an average area ratio of the TiC phase in the first B layer being 40% to 60%, and a thickness of the first B layer being 0.5 μm to 3 μm,
(d) a second B layer made of a TiCo phase and a metal Ti phase is formed adjacent to the first B layer, an average area ratio of the TiCo phase in the second B layer being 50% to 95%, and a thickness of the second B layer being 0.5 μm to 3 μm, and
(e) a residual Ti layer is present in a central region of the bonding layer sandwiched between the second A layer and the second B layer, and the WC-based cemented carbide member A, the first A layer, the second A layer, the residual Ti layer, the second B layer, the first B layer, the WC-based cemented carbide member B are bonded in an order.

2. The composite member according to claim 1, wherein an area ratio occupied by the metal W phase in the first A layer gradually decreases from the WC-based cemented carbide member A side toward the second A layer side, or
an area ratio occupied by the metal W phase in the first B layer gradually decreases from the WC-based cemented carbide member B side toward the second B layer side.

3. The composite member according to claim 1, wherein an area ratio occupied by the metal W phase in the first A layer gradually decreases from the WC-based cemented carbide member A side toward the second A layer side, and an area ratio occupied by the metal W phase in the first B layer gradually decreases from the WC-based cemented carbide member B side toward the second B layer side.

4. A cutting tool constituted by a composite member according to claim 1.

* * * * *